United States Patent
Tomomatsu

[15] 3,679,723
[45] July 25, 1972

[54] CONDENSATION PRODUCTS OF ALUMINUM HYDROXIDE AND AN ALUMINUM ALCOHOLATE

[72] Inventor: Hideo Tomomatsu, Austin, Tex.

[73] Assignee: Jefferson Chemical Company, Inc., Houston, Tex.

[22] Filed: Dec. 22, 1969

[21] Appl. No.: 889,862

Related U.S. Application Data

[62] Division of Ser. No. 821,944, May 5, 1969, Pat. No. 3,542,750.

[52] U.S. Cl. ..........................260/448 AD, 252/431, 260/2, 260/88.3
[51] Int. Cl. ..............................................C07f 5/06
[58] Field of Search ..........................260/448 AD

[56] References Cited

UNITED STATES PATENTS

| | | |
|---|---|---|
| 2,801,190 | 7/1957 | Orthner et al...................260/448 AD |
| 3,054,816 | 9/1962 | Rinse ............................260/448 AD |

FOREIGN PATENTS OR APPLICATIONS

| | | |
|---|---|---|
| 97,074 | 1/1961 | Netherlands....................260/448 AD |

OTHER PUBLICATIONS

Chemical Abstracts, Vol. 61, 14172b (1964)

*Primary Examiner*—Tobias E. Levow
*Assistant Examiner*—H. M. S. Sneed
*Attorney*—Carl G. Ries, John R. Kirk, Jr. and H. G. Jackson

[57] ABSTRACT

The condensation products of aluminum hydroxide and an aluminum alcoholate are catalysts for the polymerization of cyclic alkylene oxides. These condensation products are useful alone or in combination with an organometallic compound as a catalyst for the high molecular weight polymerization of cyclic alkylene oxides. High molecular weight polymerized cyclic alkylene oxides are useful as thickeners, water friction reducers, adhesives, cosmetics, and elastomers.

5 Claims, No Drawings

CONDENSATION PRODUCTS OF ALUMINUM HYDROXIDE AND AN ALUMINUM ALCOHOLATE

CROSS-REFERENCE TO RELATED APPLICATION

My co-pending U.S. Pat. application, Ser. No. 626,391 filed Mar. 28, 1967, now U.S. Pat. No. 3,459,685, discloses the use of polymeric aluminum isopropoxide in combination with diethyl zinc or triethylaluminum as a catalyst for polymerization of cyclic alkylene oxides.

BACKGROUND OF THE INVENTION

1. Field of the Invention

This invention pertains to the field of catalysts for polymerization of cyclic alkylene oxides.

2. Description of the Prior Art

Belgian Pat. 670,333 issued to Wyandotte Chemical Company on Mar. 26, 1966, describes the polymerization of propylene oxide with a catalyst comprised of aluminum isopropoxide, diethyl zinc, and a small amount of water. It is also known that diethyl zinc reacts with water and that the product of this reaction is a polymerization catalyst. Furukawa, J., and T. Tsuruta, R. Sakata and T. Saeguso, Makromol Chem., 32, 90 (1959). The catalysts of my invention are distinguished from the catalysts of Furukawa or Wyandotte in that the presence of water renders a catalyst completely different from the catalysts of my invention wherein anhydrous conditions are used to prepare the catalysts.

Furukawa, J., and Saegusa, T., Polymerization of Aldehydes and Oxides, published by Interscience Publishers (1963) at page 181 states: "It has been pointed out in the preceding sections that organometallic compounds, such as dialkyl zinc or triethyl aluminum, alone polymerize alkylene oxides, but the polymers produced are not high molecular weight." However, the condensation product of aluminum hydroxide and an aluminum alcoholate of my invention in combination with diethyl zinc or triethyl aluminum as a catalyst system polymerize cyclic alkylene oxides to very high molecular weights.

SUMMARY OF THE INVENTION

The invention is a class of catalysts made by reacting aluminum hydroxide with an aluminum alcoholate. The catalysts are useful for polymerizing cyclic alkylene oxides. These catalysts can also be used as co-catalysts in combination with organometallic compounds as defined herein below to polymerize cyclic alkylene oxides. The invention is also a method for polymerizing cyclic alkylene oxides by mixing them with an aluminum catalyst of my invention alone or in combination with an organometallic compound.

DESCRIPTION OF THE PREFERRED EMBODIMENTS

The catalysts of this invention are condensation products of aluminum hydroxide and an aluminum alcoholate. The aluminum alcoholate may be an aluminum alkoxide, an aluminum cycloalkoxide, or an aluminum aryloxide. The aluminum alkoxides useful in the practice of this invention have the formula $Al(OC_nH_{2n+1})_3$ wherein $n$ is one, two, three or four. Typical examples of aluminum alkoxides which may be used are aluminum methoxide, aluminum ethoxide, aluminum propoxide, aluminum isopropoxide, aluminum sec-butoxide, aluminum tert-butoxide and aluminum benzylate. A typical aluminum cycloalkoxide useful in the practice of my invention is aluminum cyclohexanolate. A typical aluminum aryloxide useful in the practice of my invention is aluminum phenoxide.

The chemical structure of the product of the reaction between aluminum hydroxide and the aluminum alcoholate may be varied by changing the mol ratio of aluminum hydroxide to aluminum alcoholate and by controlling the amount of alcohol eliminated during the reaction. The mol ratio of aluminum hydroxide to aluminum alcoholate may be varied from about 1:10 to about 10:1. An excess of aluminum hydroxide or alcoholate does not hinder the catalytic effect of the catalyst. The preferred ratio is one mol aluminum hydroxide to two mols aluminum alcoholate. Example I illustrates the preparation of a typical catalyst of my invention. The reaction should proceed under anhydrous conditions. The mixture of aluminum hydroxide and aluminum alcoholate is heated to a temperature within the range of from about 45° to about 250° C. A temperature within the range of from about 120° to about 250° C. is preferred. A solvent may be used in the reaction. The resulting catalyst or catalyst in solvent is used for the polymerization of alkylene oxides. Due to the limitations of analytical techniques, the aluminum catalyst obtained cannot be definitely structurally identified, and the possible different structures are numerous.

The aluminum catalysts of my invention may be used in combination with organometallic compounds to polymerize cyclic alkylene oxides. The organometallic compounds useful in the combination catalyst of my invention with the aluminum catalysts to polymerize cyclic alkylene oxides are those having the formula $MZX_{y-1}$ wherein M is a metal belonging to Groups II and III, and preferably Groups IIB and IIIA of the Periodic Table, Z is an alkyl, cycloalkyl or aryl group containing from 1 to 18 carbon atoms, X is hydrogen, halogen, Z or an alkoxy or aryloxy group containing 1 to 18 carbon atoms, and $y$ is a whole number equal to the valence of M. This metallic compound will contain at least one alkyl or aryl group and may contain additional such groups as alkoxy, aryloxy, hydrogen or a halogen such as chlorine, bromine or iodine. Examples of M include magnesium, calcium, strontium, barium, zinc, cadmium and aluminum. Typical examples of Z include methyl, ethyl, phenyl, butyl, hexyl, cyclobutyl, cyclohexyl and tolyl. Z is preferably an alkyl group. In addition to the above groups, X may be hydrogen, chlorine, bromine, iodine, ethoxy, propoxy, butoxy and phenoxy. Especially preferred organometallic compounds are diethyl zinc and triethyl aluminum. Other acceptable compounds include diethyl aluminum hydride, ethyl aluminum dichloride, diphenyl zinc, methyl zinc phenoxide, dilauryl cadmium, triethyl gallium, phenyl cyclohexyl beryllium and dibenzyl cadmium.

The aluminum catalysts of my invention may be used as the sole polymerization catalyst for cyclic alkylene oxides. This is especially true for ethylene oxide. When the combination catalyst of my invention is used, the weight ratio of the organometallic compound to the aluminum compound in the catalyst may be varied from 10:1 to 1:10 with the preferred ratio being from about 1:2 to 6:1. The concentration of the total catalyst may be varied from 1 to 20 wt. percent or higher based on the weight of the monomeric oxide. It is preferred to use from about 2 to 10 wt. percent catalyst. The polymerization reaction should be conducted in a dry, inert atmosphere. A dry, inert solvent is employed. The solvent may be an aliphatic or aromatic hydrocarbon or an ether. Typical solvents include cyclohexane, n-hexane, petroleum ether, pentane, heptane, benzene, toluene, diethyl ether and dipropyl ether.

The cyclic alkylene oxides that may be polymerized by my process are those containing oxygen-carbon rings in which one oxygen atom is combined with two or three carbon atoms in the ring. The ring carbon atoms may be substituted with alkyl, aryl, cycloalkyl, alkoxy, and haloalkyl groups. The most common cyclic alkylene oxides are those containing the three-membered oxirane ring. Examples of such oxides include ethylene oxide, 1,2-propylene oxide, 1,2-butylene oxide, 2,3-butylene oxide, 1,2-dodecene oxide, styrene oxide, epichlorohydrin and allyl glycidyl ether. A typical four-membered alkylene oxide is 1,3-propylene oxide, commonly referred to as oxetane. Other such cyclic oxides include 3,3-dimethyloxetane, 3,3-diethyloxetane and 3,3-di(chloromethyl)oxetane. High molecular weight polymerized cyclic alkylene oxides are useful as thickeners, water friction reducers, adhesives, cosmetics, and elastomers.

The polymerization may be run at a temperature within the range of 0° to 200° C.; however, it is preferred to employ temperatures within the range of about 25° to about 150° C. To avoid loss of volatile components, the reaction is normally conducted in a closed vessel. The particular pressure at which the reaction is conducted is not critical, and ambient pressures are generally employed.

The following examples are illustrative of my invention. Example I describes the preparation of an aluminum catalyst from aluminum hydroxide and aluminum isopropoxide. Example II is illustrative of the use of the aluminum catalyst of Example I alone to polymerize ethylene oxide. Examples III through V illustrate the use of the aluminum catalyst of my invention in combination with diethyl zinc or triethyl aluminum to polymerize various cyclic alkylene oxides. Example VI describes the preparation of an aluminum catalyst from aluminum hydroxide and aluminum sec-butoxide and the use of the resulting compound as the sole catalyst to polymerize ethylene oxide.

EXAMPLE I

This example illustrates the preparation of a typical aluminum catalyst of my invention. Aluminum hydroxide powder (7.89 grams, 0.1 mol), commercial analyzed reagent, $Al(OH)_3$ content 100.0 percent, was further pulverized and mixed with 40.8 grams (0.2 mol) of freshly distilled aluminum isopropoxide. The mixture was heated, under dry nitrogen, with stirring for one hour from 120° C. to 230° C. The effluent, isopropyl alcohol, was continuously removed from the reacting mixture by a water cooled condenser. The reaction was stopped when 0.3 mol of isopropyl alcohol had been removed. The distillation residue so obtained was 33 grams of an aluminum compound.

EXAMPLE II

This example illustrates the use of the aluminum catalyst of Example I alone to polymerize ethylene oxide. The aluminum catalyst (1.5 grams) prepared as in Example I was placed in a vessel under a dry nitrogen atmosphere. To this was added 175 ml. of freshly distilled and dried benzene and the mixture was stirred magnetically under the same inert atmosphere. Fifty grams of freshly distilled ethylene oxide was added to the mixture. The reaction vessel was closed by a stainless steel cap equipped with a Teflon O-ring and the total mixture was subjected to shaking in an oil bath at 75° C. for 15 hours. After evaporation of the solvent, 35 grams of non-sticky solid was obtained. The molecular weight of the product was 100,000.

EXAMPLE III

This example illustrates the use of the combination catalyst of my invention to polymerize propylene oxide. The aluminum catalyst (1.07 grams) of Example I was mixed, under a dry nitrogen atmosphere, with 200 ml. of freshly distilled and dried cyclohexane. This mixture was stirred with a magnetic stirrer. Under the same dry nitrogen atmosphere, 2.5 grams of 25 percent diethyl zinc solution in n-heptane was added to this mixture and the stirring was continued. Fifty grams of freshly distilled propylene oxide was added to this mixture. The reaction vessel was closed with a stainless steel cap equipped with a Teflon O-ring and the mixture was subjected to shaking in an oil bath at 80° C. for 24 hours. After the reaction, the resulting product was taken out of the vessel and placed on a pan to evaporate the solvent. After the solvent had evaporated, 49 grams of a white, non-sticky, tough rubbery material was obtained. The molecular weight of this material was 2,800,000.

EXAMPLE IV

This example illustrates the use of the combination catalyst of my invention to polymerize a mixture of propylene oxide and allyl glycidyl ether. The aluminum catalyst of Example I (4.28 grams), 10.0 grams of 25 percent diethyl zinc solution in n-heptane, and 400 ml. of freshly distilled and dried cyclohexane were mixed under a dry nitrogen atmosphere. To this mixture was added a mixture of 92 grams of freshly distilled propylene oxide and 8 grams of freshly distilled allyl glycidyl ether. The nitrogen atmosphere was maintained. The reaction vessel was closed with a stainless steel cap equipped with a Teflon O-ring and the total mixture was subjected to shaking in an oil bath at 80° C. for 24 hours. After evaporation of the solvent, the reaction product obtained was 99.5 grams of yellow colored, non-sticky, highly elastic rubbery material.

EXAMPLE V

This example illustrates the use of the combination catalyst of my invention to polymerize ethylene oxide. The aluminum catalyst of Example I (0.75 grams), 6.0 grams of 15 percent triethylaluminum solution in n-heptane, and 200 ml. of freshly distilled and dried benzene were mixed under a dry nitrogen atmosphere. To this mixture was added 50 grams of freshly distilled ethylene oxide. The nitrogen atmosphere was maintained. The reaction vessel was closed with a stainless steel cap equipped with a Teflon O-ring and the mixture was magnetically stirred for about one and one-half hours at which time the mixture became an immovable transparent gel. The mixture was subjected to shaking in an oil bath at 75° for 14 hours. After the solvent was evaporated, 51 grams of pale yellow, tough, non-elastic solid was obtained. The product was water soluble. The molecular weight was 1,000,000.

EXAMPLE VI

This example describes the preparation of an aluminum catalyst from aluminum hydroxide and aluminum sec-butoxide and the use of the resulting compound as the sole catalyst to polymerize ethylene oxide. Aluminum hydroxide powder (3.9 grams, 0.05 mol), commercial analyzed reagent, $Al(OH)_3$ content 100.0 percent, was mixed with 24.6 grams (0.1 mol) of aluminum secbutoxide. The mixture was heated under the dry nitrogen atmosphere until 7.14 grams (0.1 mol) of sec-butylalcohol was removed through a water cooled condenser. At this point, the reaction mixture was cooled and used to catalyze the following polymerization.

The product prepared above (0.9 grams) was mixed with 200 ml. of freshly distilled and dried inert hydrocarbon solvent under dry nitrogen atmosphere. To this mixture was added 50 grams of freshly distilled ethylene oxide. Maintaining the dry nitrogen atmosphere, the vessel was closed with a stainless steel cap equipped with a Teflon O-ring and the total mixture was subjected to shaking in an oil bath at 80° C. for 13 hours. After evaporation of the solvent, 12 grams of non-sticky solid was obtained. The molecular weight of the solid was 109,000.

Results comparable to those in the Examples, supra, are obtained using other catalysts and catalyst combinations of my invention for polymerizing cyclic alkylene oxides.

The catalysts of my invention are also useful as catalysts for the selective ortho-alkylation of phenols as shown in Ernest L. Yeakey's and Clarence E. Keller's co-pending U.S. Pat. application Ser. No. 821,971 filed May 5, 1969.

I claim:
1. The reaction product of
   a. aluminum hydroxide and
   b. an aluminum alkoxide an aluminum cycloalkoxide, or an aluminum aryloxide
prepared by mixing the reactants in a mol ratio from about 1:10 to about 10:1 under anhydrous conditions at a temperature within the range from about 45° C. to about 250° C.
2. The reaction product as in claim 1 of
   a. aluminum hydroxide and
   b. an aluminum alkoxide.
3. The reaction product as in claim 2 wherein the aluminum alkoxide is a compound having the formula

$$Al(OC_nH_{2n+1})_3$$

and $n$ is one, two, three, or four, the mol ratio of aluminum hydroxide to aluminum alkoxide is about 1:2 and the reaction temperature is within the range from about 120° to 250° C.
4. The reaction product as in claim 3 wherein the aluminum alkoxide is aluminum isopropoxide.
5. The reaction product as in claim 3 wherein the aluminum alkoxide is aluminum sec-butoxide.

* * * * *

UNITED STATES PATENT OFFICE
CERTIFICATE OF CORRECTION

Patent No. 3,679,723                Dated July 25, 1972

Hideo Tomomatsu
Assignor to Jefferson Chemical Company, Inc.
Houston, Texas, a corporation of Delaware It is certified that errors appear in the above-identified patent and that Letters Patent are hereby corrected as shown below:

In column 1, line 23, "Saeguso" should read -- Saegusa --; column 1, line 74, "catalystic" should read -- catalytic --. In column 3, line 25, "230" should read -- 250 --. In column 4, line 44, "13" should read -- 15 --.

Signed and sealed this 23rd day of January 1973.

(SEAL)
Attest:

EDWARD M. FLETCHER, JR.               ROBERT GOTTSCHALK
Attesting Officer                      Commissioner of Patents